United States Patent
Bennett et al.

(10) Patent No.: US 7,394,813 B2
(45) Date of Patent: Jul. 1, 2008

(54) SYSTEMS AND METHODS FOR IMPLEMENTING AN ACKNOWLEDGEMENT MECHANISM FOR TRANSMISSION OF A REAL-TIME DATA STREAM

(75) Inventors: Richard T. Bennett, Vancouver, WA (US); Daryl J. Hlasny, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 856 days.

(21) Appl. No.: 10/839,065

(22) Filed: May 5, 2004

(65) Prior Publication Data

US 2005/0249230 A1 Nov. 10, 2005

(51) Int. Cl.
*H04L 12/28* (2006.01)

(52) U.S. Cl. ...................................... 370/394; 370/428

(58) Field of Classification Search ................ None
See application file for complete search history.

(56) References Cited

U.S. PATENT DOCUMENTS

| | | | |
|---|---|---|---|
| 5,999,966 A * | 12/1999 | McDougall et al. | 709/204 |
| 6,473,425 B1 | 10/2002 | Bellaton et al. | |
| 6,574,668 B1 * | 6/2003 | Gubbi et al. | 709/237 |
| 2002/0038373 A1 | 3/2002 | Border et al. | |
| 2002/0052968 A1 | 5/2002 | Bonefas et al. | |
| 2002/0071436 A1 | 6/2002 | Border et al. | |
| 2003/0035420 A1 | 2/2003 | Niu | |

FOREIGN PATENT DOCUMENTS

| | | |
|---|---|---|
| EP | 0 912 028 | 4/1999 |
| EP | 1 180 869 | 2/2002 |
| JP | 2000-216825 | 8/2000 |
| JP | 2003-143221 | 5/2003 |
| WO | WO 01/56251 | 8/2001 |
| WO | WO 02/03597 | 1/2002 |

* cited by examiner

*Primary Examiner*—Chau T. Nguyen
*Assistant Examiner*—Dargaye H Churnet
(74) *Attorney, Agent, or Firm*—Madson & Austin (57) ABSTRACT

Systems and methods for implementing an acknowledgement mechanism for transmission of a real-time data stream from a sending system to a receiving system are disclosed. An exemplary method implemented in a sending system involves establishing a connection with a receiving system for transmitting a real-time data stream to the receiving system. The method also involves transmitting a current segment of the real-time data stream to the receiving system. If an acknowledgement of the current segment is not received from the receiving system during a predetermined time period, the method also involves discontinuing any retransmission attempts for the current segment and transmitting a next segment to the receiving system.

21 Claims, 7 Drawing Sheets

SYSTEMS AND METHODS FOR IMPLEMENTING AN ACKNOWLEDGEMENT MECHANISM FOR TRANSMISSION OF A REAL-TIME DATA STREAM

TECHNICAL FIELD

The present invention relates generally to computers and computer networking. More specifically, the present invention relates to systems and methods for implementing an acknowledgement mechanism for transmission of a real-time data stream from a sending system to a receiving system.

BACKGROUND

Computer and communication technologies continue to advance at a rapid pace. Indeed, computer and communication technologies are involved in many aspects of a person's day. For example, many devices being used today have a small computer inside of the device. These small computers come in varying sizes and degrees of sophistication. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Transmission Control Protocol (TCP) is widely used in the Internet, serving as the transport mechanism for web browsing (Hypertext Transfer Protocol), e-mail (Simple Mail Transfer Protocol), file downloading (File Transfer Protocol), and so forth.

In traditional TCP, "reliability" is defined strictly in terms of data, and not at all in terms of time. This is an appropriate definition for those applications which are not time-sensitive, or are not time-sensitive beyond the ability of the network to perform at all times and in all places. Thus, the goal of TCP is to create an exact duplicate of the sender's byte stream on the receiver's system, regardless of how long it takes. TCP incorporates a positive acknowledgement strategy in which every segment of a transfer stream is retransmitted repetitively until it is either acknowledged or the connection is broken.

For real-time applications, the timeliness of data is in many cases more important than precise accuracy. For example, in typical video streaming applications, video frames are replaced 30 times a second, and none is more important than another. The techniques employed in known TCP implementations may be inappropriate for data streams originating in real-time, because TCP segments corresponding to elements of the data stream become stale after a certain period of time (generally measured in tens of milliseconds). Current practice does not solve this problem directly, but requires various means in an audio/video rendering station to cope with starvation for data, including breakdown of the connection and a complete restart.

In view of the foregoing, benefits may be realized by means for addressing some or all of the foregoing issues. More specifically, benefits may be realized by systems and methods for implementing an acknowledgement mechanism for transmission of a real-time data stream from a sending system to a receiving system.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

A method in a sending system is disclosed. The method involves establishing a connection with a receiving system for transmitting a real-time data stream to the receiving system. The method also involves transmitting a current segment of the real-time data stream to the receiving system one or more times. If an acknowledgement of the current segment is not received from the receiving system during a predetermined time period, the method also involves discontinuing any retransmission attempts for the current segment and transmitting a next segment to the receiving system.

In some embodiments, the predetermined time period is a maximum allowable segment delay for the real-time data stream. If the acknowledgement of the current segment is not received during the predetermined time period, the method may also involve detecting expiration of a transmit timer and transmitting the next segment to the receiving system in response to the expiration of the transmit timer.

The connection between the sending system and the receiving system may be a transmission control protocol connection. The real-time data stream may be selected from the group consisting of a video stream and an audio stream.

A method in a receiving system is also disclosed. The method involves establishing a connection with a sending system for receiving a real-time data stream from the sending system. The method also involves waiting to receive a current segment of the real-time data stream from the sending system. If the current segment of the real-time data stream is not correctly delivered to the receiving system during a predetermined time period, the method also involves transmitting an acknowledgement to the sending system.

In some embodiments, the predetermined time period is a maximum allowable segment delay for the real-time data stream minus an amount of time allotted for delivery and processing of the acknowledgement. If the current segment is not received during the predetermined time period the method may also involve detecting expiration of a receive timer and transmitting the acknowledgement to the sending system in response to the expiration of the receive timer.

A sending system is also disclosed. The sending system includes a processor and memory in electronic communication with the processor. Instructions are stored in the memory. The instructions are executable to implement a method in the sending system. The method involves establishing a connection with a receiving system for transmitting a real-time data stream to the receiving system. The method also involves transmitting a current segment of the real-time data stream to the receiving system. If an acknowledgement of the current segment is not received from the receiving system during a predetermined time period, the method also involves discontinuing any retransmission attempts for the current segment and transmitting a next segment to the receiving system.

A receiving system is also disclosed. The receiving system includes a processor and memory in electronic communication with the processor. Instructions are stored in the memory. The instructions are executable to implement a method in the receiving system. The method involves establishing a connection with a sending system for receiving a real-time data stream from the sending system. The method also involves waiting to receive a current segment of the real-time data stream from the sending system. If the current segment of the real-time data stream is not correctly delivered to the receiving system during a predetermined time period, the method also involves transmitting an acknowledgement to the sending system.

A computer-readable medium for storing program data is also disclosed. The program data comprises executable instructions for implementing a method in a sending system. The method involves establishing a connection with a receiving system for transmitting a real-time data stream to the receiving system. The method also involves transmitting a current segment of the real-time data stream to the receiving system. If an acknowledgement of the current segment is not received from the receiving system during a predetermined time period, the method also involves discontinuing any retransmission attempts for the current segment and transmitting a next segment to the receiving system.

Another embodiment of a computer-readable medium for storing program data is also disclosed. The program data comprises executable instructions for implementing a method in a receiving system. The method involves establishing a connection with a sending system for receiving a real-time data stream from the sending system. The method also involves waiting to receive a current segment of the real-time data stream from the sending system. If the current segment of the real-time data stream is not correctly delivered to the receiving system during a predetermined time period, the method also involves transmitting an acknowledgement to the sending system.

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

Figure 1:
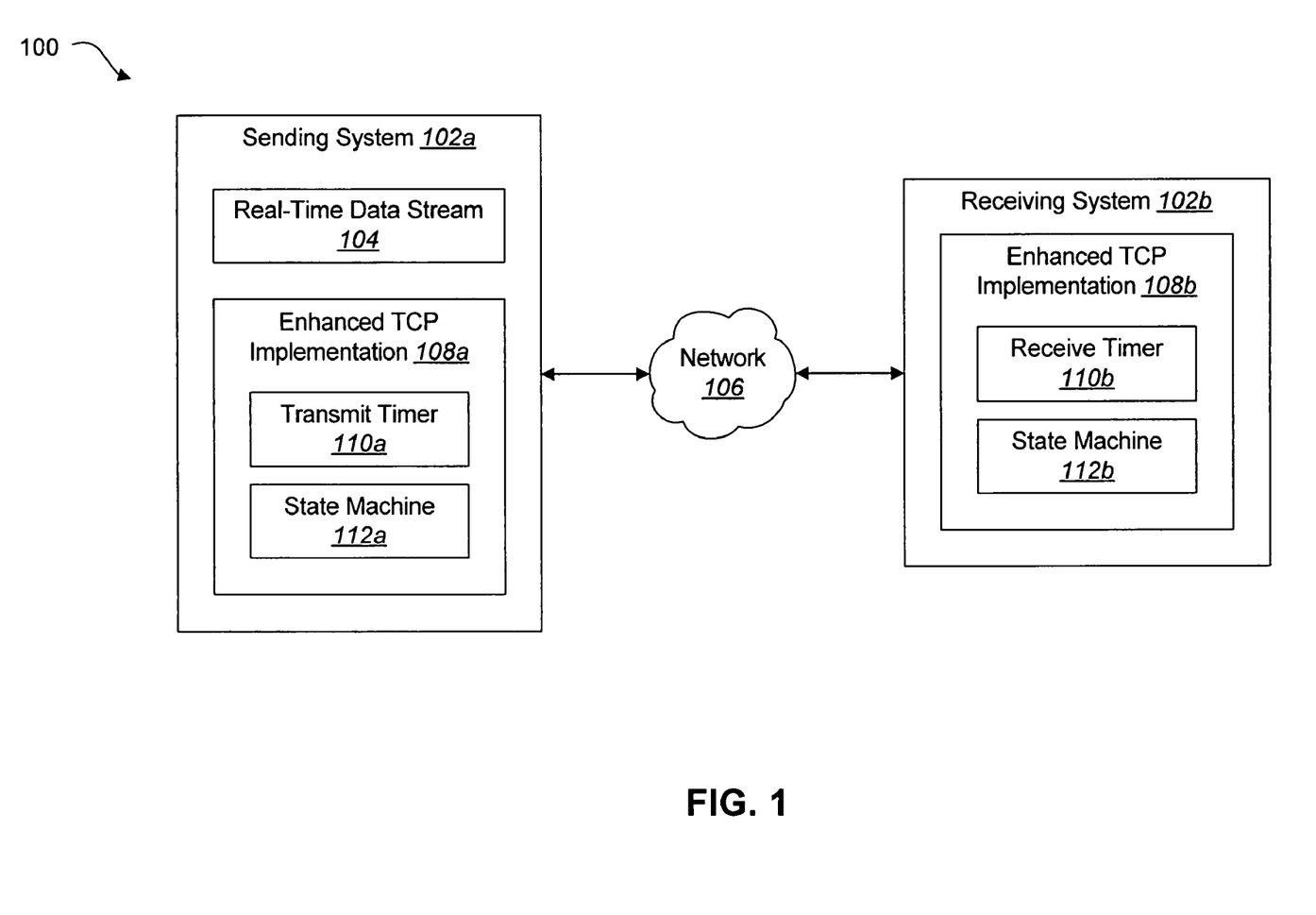
FIG. 1 is a block diagram illustrating an exemplary operating environment in which some embodiments may be practiced.

FIG. 1 is a block diagram illustrating an exemplary operating environment 100 in which some embodiments may be practiced. As shown, embodiments disclosed herein involve interaction between a sending system 102a and a receiving system 102b. Communication between the sending system 102a and the receiving system 102b may occur via one or more computer networks 106.

The sending system 102a is transmitting a data stream 104 to the receiving system 102b. The data stream 104 is being transmitted to the receiving system 102b in real time. In a real-time data stream 104, any segment of the data stream 104 (which may be a frame of data, a portion of a frame of data, etc.) is only relevant for a certain period of time. After this time the segment becomes "stale," and a subsequent segment of the data stream 104 becomes relevant. For example, in typical implementations, a frame in a real-time video stream is only relevant for $\frac{1}{30}^{th}$ of a second, after which time it is replaced by a subsequent frame.

The real-time data stream 104 is being transmitted to the receiving system 102b in accordance with an enhanced version of the transmission control protocol (TCP), i.e., both the sending system 102a and the receiving system 102b include an enhanced TCP implementation 108. As indicated previously, known implementations of TCP incorporate a positive acknowledgement strategy in which every segment of a transfer stream is retransmitted repetitively until it is either acknowledged or the connection is broken. In contrast, the enhanced TCP implementation 108 allows the sending system 102a to skip over TCP segments that have become stale. For example, suppose that a segment in the real-time data stream 104 has relevance for a certain time period. In this situation, if the sending system 102a has not received an acknowledgement from the receiving system 102b within this time period, the sending system 102a skips the current segment and moves on to the next segment. In other words, the sending system 102a ceases any retransmission attempts for the current segment once the current segment is no longer relevant.

In the embodiment shown in FIG. 1, a two-stage model is used to determine when a segment of the data stream 104 can be skipped. First, after a predetermined time period has elapsed, the receiving system 102b forces an acknowledgement to be sent to the sending system 102a, even if the segment has not been delivered correctly to the receiving system 102b. In the event that this acknowledgement is not delivered correctly to the sending system 102a, the sending system 102a acts as if it has received an acknowledgement and proceeds to the next segment once the current segment is no longer relevant.

As shown in FIG. 1, this functionality may be accomplished by means of two timers 110, a transmit timer 110a at the sending system 102a and a receive timer 110b at the receiving system 102b. Both timers 110 cause a state machine 112 to operate. The state machine 112 at the sending system 102a is designated 112a in FIG. 1, and the state machine 112 at the receiving system 102b is designated 112b in FIG. 1.

Figure 2:
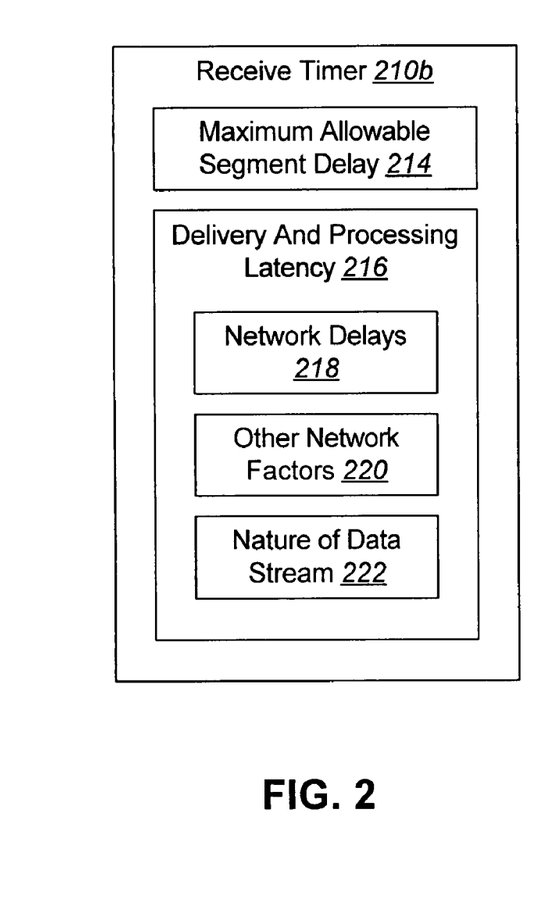
FIG. 2 is a block diagram illustrating an embodiment of a receive timer.

FIG. 2 is a block diagram illustrating an embodiment of the receive timer 210b. In the illustrated embodiment, the value of the receive timer 210b is equal to the maximum allowable segment delay 214 minus the latency 216 associated with delivery and processing of an acknowledgement.

The maximum allowable segment delay 214 is a period of time that indicates how long a segment of the data stream 104 is relevant. In the video streaming example discussed above, where a frame in the video stream has relevance for $1/30^{th}$ of a second, the maximum allowable segment delay 214 is substantially equal to $1/30^{th}$ of a second.

Where the receiving system 102b prompts the sending system 102a to skip the segment, the receiving system 102b initiates the acknowledgement action at a time less than the maximum allowable segment delay 214, allowing for the fact that the acknowledgement is not instantaneously delivered to and processed by the sending system 102a. Therefore, the receive timer 210b is set to a value that subtracts delivery and processing latency 216 from the maximum allowable delay 214. In typical embodiments, the delivering and processing latency 216 is determined empirically from network delays 218 caused by software and hardware, other network factors 220 such as network acquisition delay and network propagation delay, and from the nature 222 of the data stream 104 of which the segment in question is a part.

The receive timer 210b allows an acknowledgement to be received and processed by the sending system 102a at the last instant of the time window in which the segment in question is still important. In other words, the receive timer 210b causes an acknowledgement to be sent to the sending system 102a and processed before the segment in question spills over into or encroaches upon the time slot belonging to the following segment.

Figure 3:
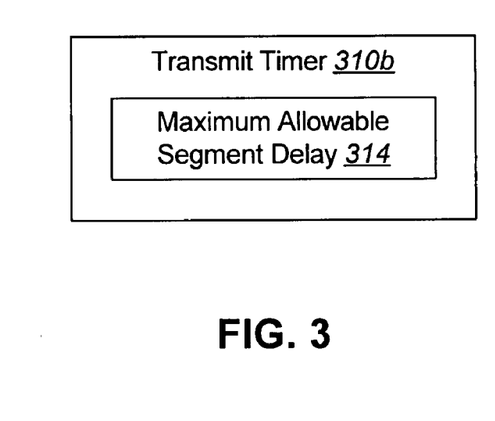
FIG. 3 is a block diagram illustrating an embodiment of a transmit timer.

FIG. 3 is a block diagram illustrating an embodiment of the transmit timer 310a. In typical implementations, the value of the transmit timer 310a is set to the maximum allowable delay 314 of the segment. The value of the transmit timer 310a is generally independent of network processing delays, which can be assumed to be constant in its time reference with respect to preceding frames.

Figure 4:
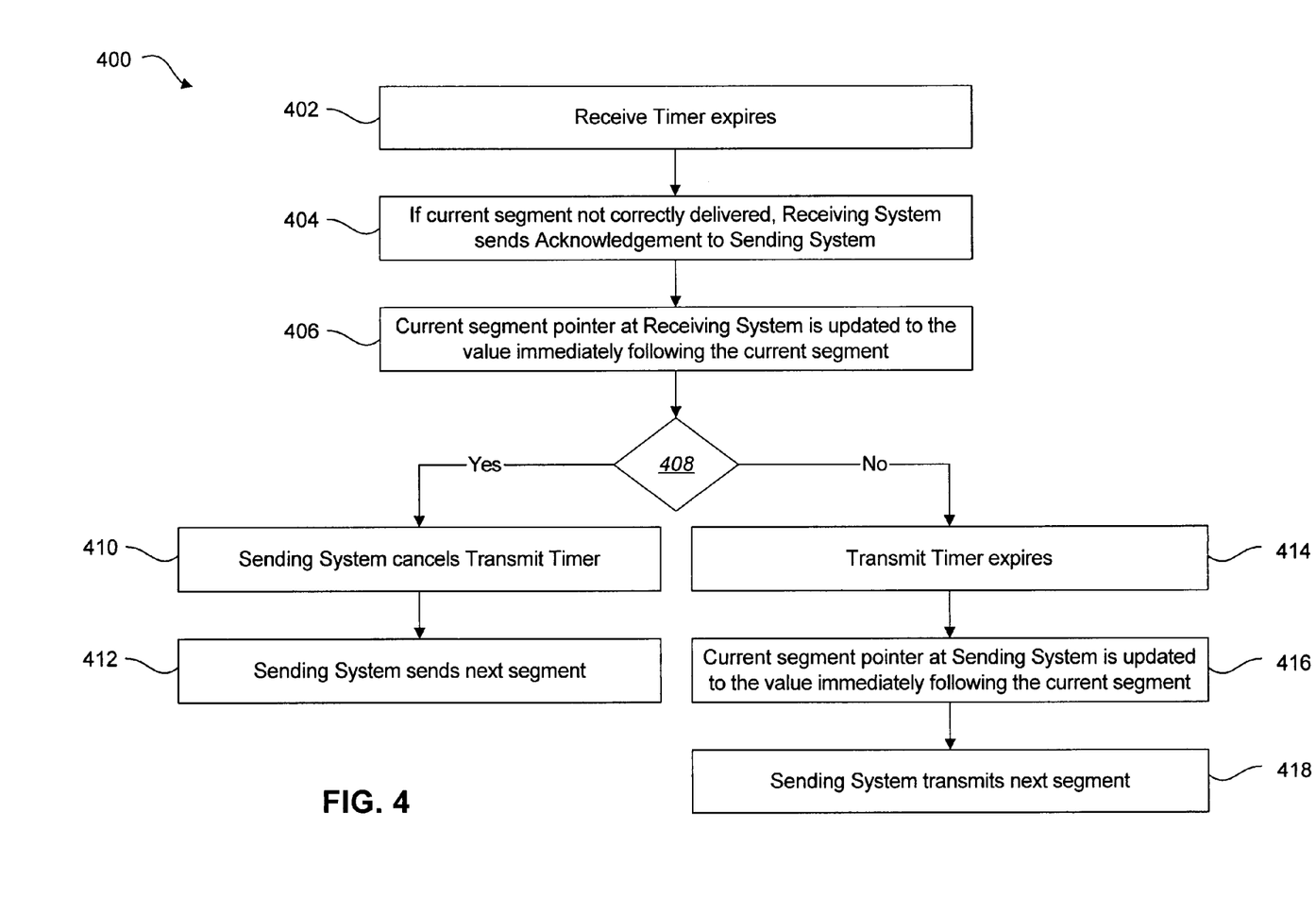
FIG. 4 is a flow diagram illustrating an embodiment of a method that may be performed by a sending system and a receiving system.

FIG. 4 is a flow diagram illustrating an embodiment of a method 400 that may be performed by the sending system 102a and the receiving system 102b. The method 400 is typically performed when the sending system 102a has transmitted a current segment of a real-time data stream 104 to the receiving system 102b via a TCP connection.

The method 400 begins when the receive timer 110b expires 402. In response to the receive timer 110b expiring 402, the receiving system 102b determines whether the current segment has been correctly delivered to the receiving system 102b. In some embodiments, this involves the state machine 112b at the receiving system 102b searching the state of the TCP receive logic to determine whether it is in the state where it is waiting for a segment, and whether it has previously discarded the segment for which it is waiting. If both of these conditions are true, the current segment has not been correctly delivered to the receiving system 102b.

If the current segment has not been correctly delivered to the receiving system 102b, the receiving system 102b sends 404 an acknowledgement to the sending system 102a. The current segment pointer at the receiving system 102b is updated 406 to the value immediately following the current segment.

If the sending system 102a receives 408 the acknowledgement, the sending system 102a cancels 410 the transmit timer 110a and sends 412 the next segment to the receiving system 102b. If the sending system 102 does not receive 408 the acknowledgement, the transmit timer 110a expires 414. In response to the transmit timer 10a expiring, the current segment pointer at the sending system 102a is updated 416 to the value immediately following the current segment. This causes the next segment to be transmitted 418 at the next opportunity, bringing the receiving system 102b up-to-date with the real-time data stream 104.

Figure 5:
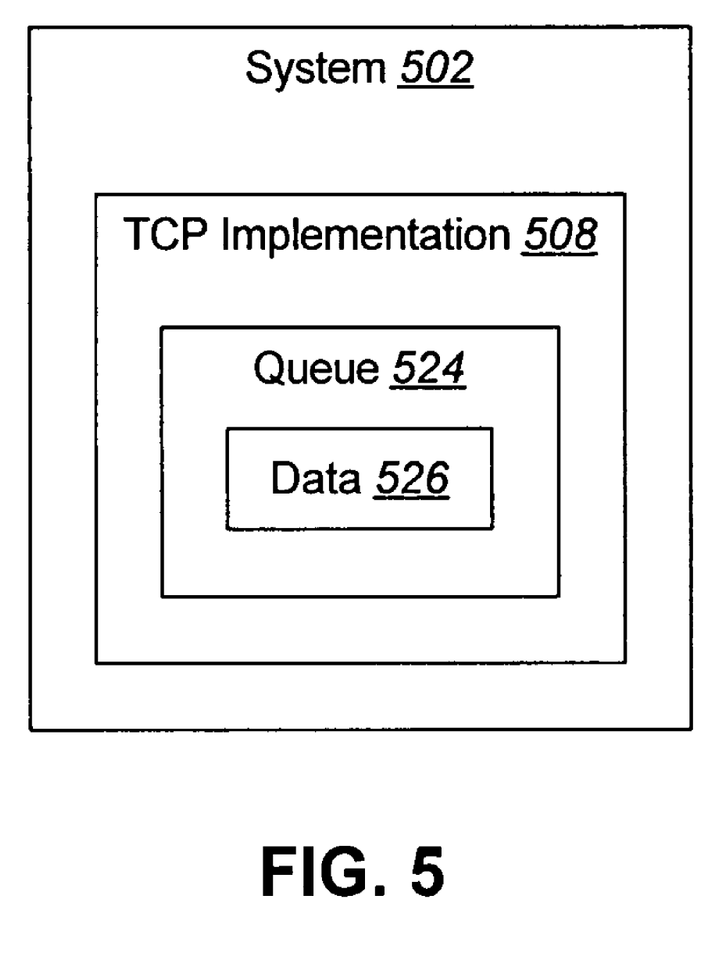
FIG. 5 is a block diagram illustrating a queue maintained by a TCP implementation.

In some embodiments, both the transmit timer 110a and the receive timer 10b may be implemented as a hardware clock. Alternatively, as shown in FIG. 5, the timers 110 may be derived from the size of a queue 524 that is maintained by the TCP implementation 508. Under normal operation, the TCP implementation 508 has a certain amount of data 526 buffered in an internal queue 524. A timer 110 may be derived from the size of the queue 524. For example, at the receiving system 102b, the data 526 in the queue 524 is typically delivered to an application on demand. If the application's requests for data 526 occur on a regular timeline, the size of the queue 524 may function as a timer 110.

It may be preferable to implement the receive timer 10b as a hardware clock if the application that is receiving the data 526 is an audio/video rendering application. Such applications are much more likely to accept all of the data 526 they can get, and then rely on a hardware clock to regulate their output. A hardware clock may also be more appropriate for the transmit timer 110a at the sending system 102a, because there is a tendency in software design to push as much data 526 into the pipe as possible and to leave flow control to the receiving system 102b.

Figure 6:
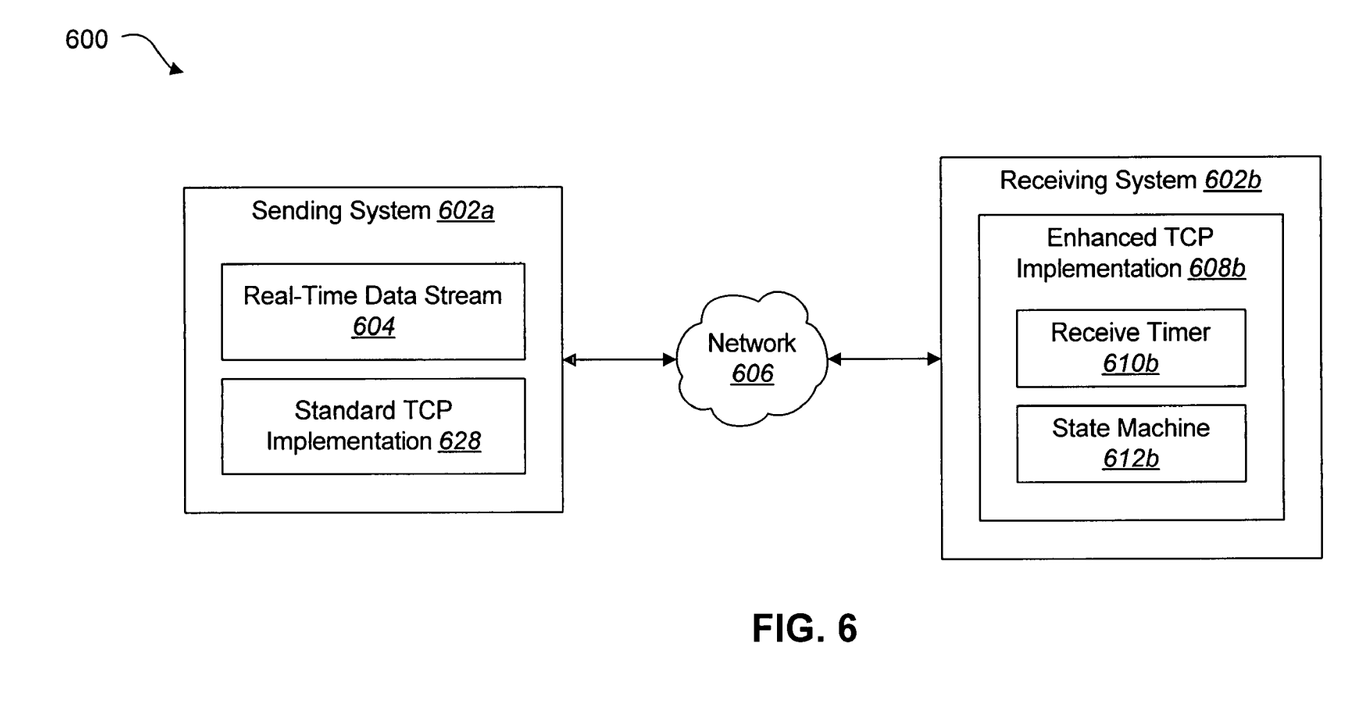
FIG. 6 is a block diagram illustrating another exemplary operating environment in which some embodiments may be practiced.

FIG. 6 is a block diagram illustrating another exemplary operating environment 600 in which some embodiments may be practiced. The operating environment 600 includes a sending system 602a that has established a TCP connection with a receiving system 602b via one or more computer networks 606. The receiving system 602b includes an enhanced TCP implementation 608b, which includes a receive timer 610b and a state machine 612b. The sending system 602a does not include an enhanced TCP implementation. Rather, the sending system 602a includes a standard TCP implementation 628.

In the embodiment shown in FIG. 6, a single-stage model is used to determine when a segment of the data stream 604 can be skipped. As before, after a predetermined time period has elapsed, the receiving system 602b forces an acknowledgement to be sent to the sending system 602a, even if the segment has not been delivered correctly to the receiving system 602b. If the acknowledgement is delivered correctly to the sending system 602a, the sending system 602a proceeds to the next segment.

Figure 7:
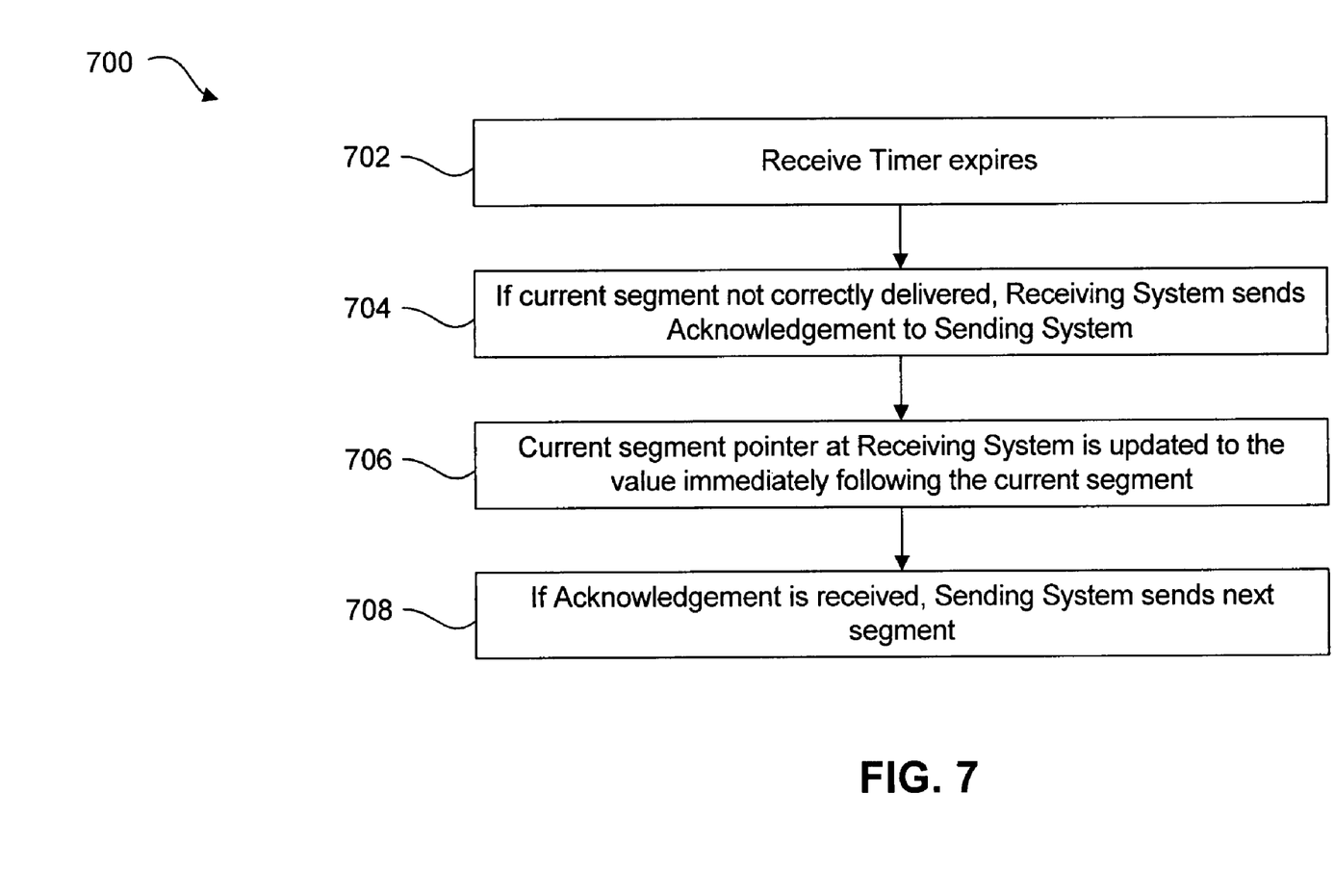
FIG. 7 is a flow diagram illustrating an exemplary method that may be performed by the sending system and the receiving system in the operating environment shown in FIG. 6.

FIG. 7 is a flow diagram illustrating an exemplary method 700 that may be performed by the sending system 602a and the receiving system 602b in the operating environment 600 shown in FIG. 6. At some point, the receive timer 610b expires 702. In response to the receive timer 710b expiring 702, the receiving system 602b determines whether the current segment has been correctly delivered to the receiving system 602b.

If the current segment has not been correctly delivered to the receiving system 602b, the receiving system 602b sends 704 an acknowledgement to the sending system 602a. The current segment pointer at the receiving system 602b is updated 706 to the value immediately following the current segment. If the sending system 602a receives the acknowledgement, the sending system 602a sends 708 the next segment to the receiving system 102b.

Additional alternative configurations are possible. For example, in some embodiments, the sending system includes an enhanced TCP implementation and the receiving system only includes a standard TCP implementation. However, one possible difficulty with such a configuration is that the receiving system may not be capable of delivering out-of-sequence data. In such a situation, the sending system may substitute the new segment into the index boundaries of the discarded segment, or something similar.

Embodiments disclosed herein may be useful in a wide variety of contexts. For example, some embodiments may be practiced in a home networking environment. The Digital Home Working Group (DHWG) has developed a set of networking requirements for audio/video streaming known as Home Network Version 1 (HNv1) which require HTTP and TCP to be implemented as the mandatory transport. Embodiments disclosed herein may be used to implement streaming audio/video in accordance with the DHWG/DLNA requirements while still providing a satisfactory viewing experience.

In the foregoing discussion, it has been assumed that the receiving application at the receiving system is capable of synchronizing to application-layer boundaries such as MPEG I-frames even after TCP segments are discarded by the receiving system or the transmitting system. This may not always be the case. In implementations where this assumption is not correct, the receiving system may adopt a means of locating application-layer boundaries in the TCP byte stream. This may be facilitated by RFCs dealing with the alignment of application layer traffic with transport layer boundaries, as in the case for MPEG over RTP.

Figure 8:
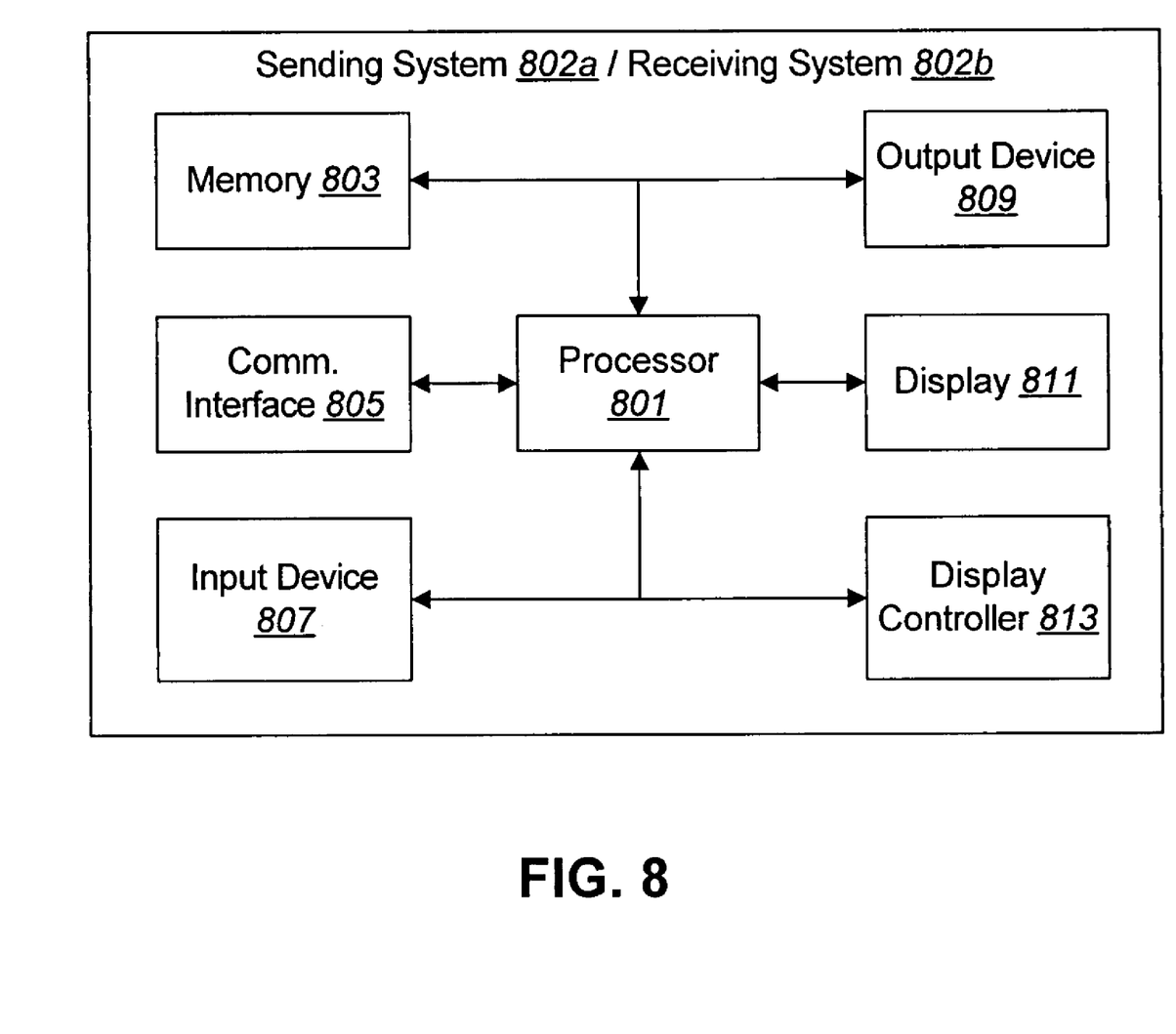
FIG. 8 is a block diagram illustrating the major hardware components typically utilized in a sending system and/or a receiving system.

FIG. 8 is a block diagram illustrating the major hardware components typically utilized in a sending system 802a and/or a receiving system 802b. The illustrated components may be located within the same physical structure or in separate housings or structures.

The sending system 802a and/or receiving system 802b includes a processor 801 and memory 803. The processor 801 controls the operation of the system 802 and may be embodied as a microprocessor, a microcontroller, a digital signal processor (DSP) or other device known in the art. The processor 801 typically performs logical and arithmetic operations based on program instructions stored within the memory 803.

As used herein, the term "memory" 803 is broadly defined as any electronic component capable of storing electronic information, and may be embodied as read only memory (ROM), random access memory (RAM), magnetic disk storage media, optical storage media, flash memory devices in RAM, on-board memory included with the processor 801, EPROM memory, EEPROM memory, registers, etc. The memory 803 typically stores program instructions and other types of data. The program instructions may be executed by the processor 801 to implement some or all of the methods disclosed herein.

The sending system 802a and/or receiving system 802b typically also includes one or more communication interfaces 805 for communicating with other electronic devices. The communication interfaces 805 may be based on wired communication technology, wireless communication technology, or both. Examples of different types of communication interfaces 805 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The sending system 802a and/or receiving system 802b typically also includes one or more input devices 807 and one or more output devices 809. Examples of different kinds of input devices 807 include a keyboard, mouse, microphone, remote control device, button, joystick, trackball, touchpad, lightpen, etc. Examples of different kinds of output devices 809 include a speaker, printer, etc. One specific type of output device which is typically included in a computer system is a display device 811. Display devices 811 used with embodiments disclosed herein may utilize any suitable image projection technology, such as a cathode ray tube (CRT), liquid crystal display (LCD), light-emitting diode (LED), gas plasma, electroluminescence, or the like. A display controller 813 may also be provided, for converting data stored in the memory 803 into text, graphics, and/or moving images (as appropriate) shown on the display device 811.

Of course, FIG. 8 illustrates only one possible configuration of the sending system 802a and/or receiving system 802b. Those skilled in the art will recognize that various other architectures and components may be utilized. In addition, various standard components are not illustrated in order to avoid obscuring aspects of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In a sending system, a method comprising: establishing a connection with a receiving system for transmitting a real-time data stream to the receiving system;
    transmitting a current segment of the real-time data stream to the receiving system;
    receiving a positive acknowledgement of the current segment from the recieving system, wherein the current segment is not correctly delivered to the receiving system, and wherein the receiving system sends the positive acknowledgement of the current segment after a predetermined time period; and
    in response to receiving the positive acknowledgement, transmitting a next segment to the receiving system.

2. The method of claim 1, wherein the predetermined time period is a maximum allowable segment delay for the real-time data stream.

3. The method of claim 1, wherein the connection is a transmission control protocol connection, and wherein the real-time data stream is selected from the group consisting of a video stream and an audio stream.

4. In a receiving system, a method comprising:
    establishing a connection with a sending system for receiving a real-time data stream from the sending system;
    waiting to receive a current segment of the real-time data stream from the sending system; and
    if the current segment of the real-time data stream is not correctly delivered to the receiving system during a predetermined time period, transmitting a positive acknowledgement to the sending system.

5. The method of claim 4, wherein the predetermined time period is a maximum allowable segment delay for the real-time data stream minus an amount of time allotted for delivery and processing of the acknowledgement.

6. The method of claim 4, wherein if the current segment is not received during the predetermined time period the method further comprises:
    detecting expiration of a receive timer; and
    transmitting the acknowledgement to the sending system in response to the expiration of the receive timer.

7. The method of claim 4, wherein the connection is a transmission control protocol connection, and wherein the real-time data stream is selected from the group consisting of a video stream and an audio stream.

8. A sending system, comprising:
    a processor;
    memory in electronic communication with the processor; and
    instructions stored in the memory, the instructions being executable to:
        establish a connection with a receiving system for transmitting a real-time data stream to the receiving system;
        transmit a current segment of the real-time data stream to the receiving system;
        receive a positive acknowledgement of the current segment from the receiving system, wherein the current segment is not correctly delivered to the receiving system, and wherein the receiving system sends the positive acknowledgement of the current segment after a predetermined time period; and
        in response to receiving the positive acknowledgement, transmit a next segment to the receiving system.

9. The sending system of claim 8, wherein the predetermined time period is a maximum allowable segment delay for the real-time data stream.

10. The sending system of claim 8, wherein the connection is a transmission control protocol connection, and wherein the real-time data stream is selected from the group consisting of a video stream and an audio stream.

11. A receiving system, comprising:
    a processor;
    memory in electronic communication with the processor; and
    instructions stored in the memory, the instructions being executable to:
        establish a connection with a sending system for receiving a real-time data stream from the sending system;
        wait to receive a current segment of the real-time data stream from the sending system; and
        if the current segment of the real-time data stream is not correctly delivered to the receiving system during a predetermined time period, transmit a positive acknowledgement to the sending system.

12. The receiving system of claim 11, wherein the predetermined time period is a maximum allowable segment delay for the real-time data stream minus an amount of time allotted for delivery and processing of the acknowledgement.

13. The receiving system of claim 11, wherein if the current segment is not received during the predetermined time period the method further comprises:
   detecting expiration of a receive timer; and
   transmitting the acknowledgement to the sending system in response to the expiration of the receive timer.

14. The receiving system of claim 11, wherein the connection is a transmission control protocol connection, and wherein the real-time data stream is selected from the group consisting of a video stream and an audio stream.

15. A computer-readable medium comprising excutable instructions:
   establishing a connection with a receiving system for transmitting a real-time data stream to the receiving system;
   transmitting a current segment of the real-time data stream to the receiving system;
   receiving a positive acknowledgement of the current segment from the receiving system, wherein the current segment is not correctly delivered to the receiving system, and wherein the receiving system sends the positive acknowledgement of the current segment after a predetermined time period; and
   in response to receiving the positive acknowledgement, transmitting a next segment to the receiving system.

16. The computer-readable medium of claim 15, wherein the predetermined time period is a maximum allowable segment delay for the real-time data stream.

17. The computer-readable medium of claim 15, wherein the connection is a transmission control protocol connection, and wherein the real-time data stream is selected from the group consisting of a video stream and an audio stream.

18. A computer-readable medium comprising executable instructions for:
   establishing a connection with a sending system for receiving a real-time data stream from the sending system;
   waiting to receive a current segment of the real-time data stream from the sending system; and
   if the current segment of the real-time data stream is not correctly delivered to the receiving system during a predetermined time period, transmitting a positive acknowledgement to the sending system.

19. The computer-readable medium of claim 18, wherein the predetermined time period is a maximum allowable segment delay for the real-time data stream minus an amount of time allotted for delivery and processing of the acknowledgement.

20. The computer-readable medium of claim 18, wherein if the current segment is not received during the predetermined time period the method further comprises:
   detecting expiration of a receive timer; and
   transmitting the acknowledgement to the sending system in response to the expiration of the receive timer.

21. The computer-readable medium of claim 18, wherein the connection is a transmission control protocol connection, and wherein the real-time data stream is selected from the group consisting of a video stream and an audio stream.

* * * * *

UNITED STATES PATENT AND TRADEMARK OFFICE
CERTIFICATE OF CORRECTION

PATENT NO.      : 7,394,813 B2  
APPLICATION NO. : 10/839065  
DATED           : July 1, 2008  
INVENTOR(S)     : Richard T. Bennett et al.

Page 1 of 1

It is certified that error appears in the above-identified patent and that said Letters Patent is hereby corrected as shown below:

In Column 6, line 32 please replace "10a" with --110a--.  
In Column 6, line 39 please replace "10b" with --110b--.  
In Column 6, line 50 please replace "10b" with --110b--.  
In Column 9, line 58 please replace "recieving" with --receiving--.  
In Column 11, line 15 please replace "excutable" with --executable--.  
In Column 11, line 16 please replace "instructions:" with --instructions for:--.

Signed and Sealed this

Thirtieth Day of December, 2008

JON W. DUDAS  
*Director of the United States Patent and Trademark Office*